US012328366B2

(12) United States Patent
Wei et al.

(10) Patent No.: US 12,328,366 B2
(45) Date of Patent: Jun. 10, 2025

(54) METHOD AND APPARATUS FOR SESSION SERVICE MANAGEMENT

(71) Applicant: Telefonaktiebolaget LM Ericsson (PUBL), Stockholm (SE)

(72) Inventors: Zhansheng Wei, Shanghai (CN); Yingjiao He, Shanghai (CN); Wu Wang, Shanghai (CN); Wenjun Liu, Shanghai (CN); Yunjie Lu, Shanghai (CN); Huaicheng Dai, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

(21) Appl. No.: 18/262,944

(22) PCT Filed: Jan. 21, 2022

(86) PCT No.: PCT/CN2022/073194
§ 371 (c)(1),
(2) Date: Jul. 26, 2023

(87) PCT Pub. No.: WO2022/161276
PCT Pub. Date: Aug. 4, 2022

(65) Prior Publication Data
US 2024/0146812 A1    May 2, 2024

(30) Foreign Application Priority Data
Jan. 29, 2021    (WO) ................ PCT/CN2021/074443

(51) Int. Cl.
*H04L 67/14*    (2022.01)
*H04W 76/34*    (2018.01)
*H04W 80/10*    (2009.01)

(52) U.S. Cl.
CPC ............. *H04L 67/14* (2013.01); *H04W 76/34* (2018.02); *H04W 80/10* (2013.01)

(58) Field of Classification Search
CPC ........ H04L 67/14; H04W 76/34; H04W 80/10
See application file for complete search history.

(56) References Cited

U.S. PATENT DOCUMENTS 10,834,636 B2 *  11/2020  Talebi Fard ........ H04W 28/065
11,240,719 B2 *   2/2022  Park ................. H04W 36/0016
(Continued)

FOREIGN PATENT DOCUMENTS

CN          110149665 A      8/2019
WO      WO2020197451 A1    10/2020
(Continued)

OTHER PUBLICATIONS

3GPP TSG-CT WG4 Meeting #102e; E-Meeting, Feb. 23-Mar. 5, 2021; Change Request; 29.502 CR 0418 rev—Current version: 17.0.0; Title: UPF ID for N4 Information (C4-211313).
(Continued)

*Primary Examiner* — G. C. Neurauter, Jr.
(74) *Attorney, Agent, or Firm* — Baker Botts L.L.P.

(57) ABSTRACT

Various embodiments of the present disclosure provide methods and apparatuses for session service management. A method performed by a first session management function comprises determining first N4 information related to a user plane function (UPF). The first N4 information comprises an identifier of the UPF. The method further comprises sending a first message comprising the first N4 information to a second session management function.

20 Claims, 8 Drawing Sheets

Local Access to the same DN

(56) References Cited

U.S. PATENT DOCUMENTS

| | | | |
|---|---|---|---|
| 11,356,888 B2* | 6/2022 | Li | H04W 40/24 |
| 11,496,581 B2* | 11/2022 | Kweon | H04L 67/51 |
| 11,558,346 B2* | 1/2023 | Zong | H04L 61/5046 |
| 11,765,055 B2* | 9/2023 | Kweon | H04L 41/5051 709/223 |
| 2018/0324646 A1 | 11/2018 | Lee et al. | |
| 2019/0394833 A1* | 12/2019 | Talebi Fard | H04W 68/005 |
| 2020/0053828 A1 | 2/2020 | Bharatia et al. | |
| 2020/0351984 A1* | 11/2020 | Talebi Fard | H04W 76/40 |
| 2020/0367090 A1* | 11/2020 | Zhang | H04W 76/27 |
| 2021/0377838 A1* | 12/2021 | Ali | H04W 8/08 |
| 2021/0385723 A1* | 12/2021 | Zong | H04M 15/8016 |
| 2022/0200813 A1* | 6/2022 | Thiebaut | H04L 12/1407 |
| 2022/0232369 A1* | 7/2022 | Puente Pestaña | H04L 67/14 |
| 2022/0330129 A1* | 10/2022 | Yao | H04W 40/24 |
| 2023/0025793 A1* | 1/2023 | Xiong | H04W 36/0007 |
| 2023/0104162 A1* | 4/2023 | Hallenstål | H04W 76/22 370/328 |
| 2023/0370830 A1* | 11/2023 | Sander | H04W 76/10 |
| 2023/0388268 A1* | 11/2023 | Lu | H04L 67/51 |
| 2024/0146812 A1* | 5/2024 | Wei | H04W 76/22 |
| 2024/0195846 A1* | 6/2024 | Zhang | H04W 36/0011 |

FOREIGN PATENT DOCUMENTS

| | | | |
|---|---|---|---|
| WO | 2020 249032 A1 | | 12/2020 |
| WO | WO-2021134601 A1 | * | 7/2021 |
| WO | WO-2022001473 A1 | * | 1/2022 |

OTHER PUBLICATIONS

Japanese Office Action issued Sep. 6, 2024 for Patent Application Serial No. 2023-546348.

SA WG2 Meeting #131; Santa Cruz—Tenerife, Spain; Feb. 25-Mar. 1, 2019; Change Request; 23.502 CR 1003 rev—Current version: 15.4.1; Title: Nsmf_PDUSession_ContextRequest service operation Update (S2-1901511 (revision of S2-19xxxx)).

3GPP TS 23.501 V16.7.0 (Dec. 2020); 3rd Generation Partnership Project; Technical Specification Group Services and System Aspects; System architecture for the 5G System (5GS); Stage 2 (Release 16).

3GPP TS 23.503 V16.7.0 (Dec. 2020); 3rd Generation Partnership Project; Technical Specification Group Services and System Aspects; Policy and charging control framework for the 5G System (5GS); Stage 2 (Release 16).

3GPP TS 32.255 V17.0.0 (Dec. 2020); 3rd Generation Partnership Project; Technical Specification Group Services and System Aspects; Telecommunication management; Charging management; 5G data connectivity domain charging; stage 2 (Release 17).

3GPP TS 23.502 V16.7.1 (Jan. 2021); 3rd Generation Partnership Project; Technical Specification Group Services and System Aspects; Procedures for the 5G System (5GS); Stage 2 (Release 16).

3GPP TS 29.502 V16.6.0 (Dec. 2020); 3rd Generation Partnership Project; Technical Specification Group Core Network and Terminals; 5G System; Session Management Services; Stage 3 (Release 16).

3GPP TSG-CT WG4 Meeting #96e; E-Meeting, Feb. 17-28, 2020; Change Request; 29.502 CR 0290 rev 1 Current version: 16.2.0; Title: UPF Instance ID (C4-201140 (Revision of C4-200708)).

PCT Notification of Transmittal of the International Search Report and the Written Opinion of the International Searching Authority, or the Declaration issued for International application No. PCT/CN2022/073194—Apr. 19, 2022.

Office Action issued for ROC (Taiwan) Patent Application No. 110146881—Aug. 25, 2022.

3GPP TS 29.502 v16.4.0 (Jul. 2020) 3rd Generation Partnership Project; Technical Specification Group Core Network and Terminals; 5G System; Session Management Services; Stage 3 (Release 16).

3GPP TSG-CT WG4 Meeting #102-e; E-Meeting, Feb. 24-Mar. 5, 2021; Change Request; 29.502 CR 0418 rev 2 Current version: 16.6.0; Title: UPF ID for N4 Information (C4-211727 (was C4-211672)).

Extended European Search Report issued for Application No. / Patent No. 22745151.5-1215 / 4285689 PCT/CN2022073194—Nov. 22, 2024.

* cited by examiner

600

602

Determining first N4 information related to a user plane function, UPF, wherein the first N4 information comprises an identifier of the UPF

604

Sending a first message comprising the first N4 information to a second session management function

Receiving a fourth message comprising fourth N4 information related to the UPF from the second session management function, wherein the fourth N4 information comprises the identifier of the UPF

704

Sending the fourth message to the UPF based on the identifier of the UPF

Receiving a first message comprising first N4 information related to a user plane function, UPF, from a first session management function, wherein the first N4 information comprises an identifier of the UPF

804

Processing the first message based on identifier of the UPF

806

Sending a fourth message comprising fourth N4 information related to the UPF to the first session management function, wherein the fourth N4 information comprises the identifier of the UPF

FIG. 8

METHOD AND APPARATUS FOR SESSION SERVICE MANAGEMENT

PRIORITY

This nonprovisional application is a U.S. National Stage Filing under 35 U.S.C. § 371 of International Patent Application Serial No. PCT/CN2022/073194 filed Jan. 21, 2022 and entitled "METHOD AND APPARATUS FOR SESSION SERVICE MANAGEMENT" which claims priority to International Patent Application Serial No. PCT/CN2021/074443 filed Jan. 29, 2021, both of which are hereby incorporated by reference in their entirety.

FIELD OF THE INVENTION

The present disclosure generally relates to communication networks, and more specifically, to method and apparatus for session service management.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing various network function services for various communication networks.

Single protocol data unit (PDU) session with multiple PDU Session Anchors (PSA) is specified in 3GPP TS 23.501 V16.7.0, the disclosure of which is incorporated by reference herein in their entirety. In order to support selective traffic routing to the DN (data network) or to support SSC (Session and Service Continuity) mode 3 as defined in clause 5.6.9.2.3 of 3GPP TS 23.501 V16.7.0, the SMF (Session Management Function) may control the data path of a PDU Session so that the PDU Session may simultaneously correspond to multiple N6 interfaces. The UPF that terminates each of these interfaces is said to support PDU Session Anchor functionality. Each PDU Session Anchor supporting a PDU Session provides a different access to the same DN. Further, the PDU Session Anchor assigned at PDU (User Plane Function) Session Establishment is associated with the SSC mode of the PDU Session and the additional PDU Session Anchor(s) assigned within the same PDU Session e.g. for selective traffic routing to the DN are independent of the SSC mode of the PDU Session. When a PCC (Policy and Charging Control) rule including the AF (application function) influenced Traffic Steering Enforcement Control information defined in clause 6.3.1 of 3GPP TS 23.503 V16.7.0 is provided to the SMF, the SMF can decide whether to apply traffic routing (by using UL (uplink) Classifier functionality or IPv6 (Internet protocol version 6) multi-homing) based on DNAI(s) (DN Access Identifier) included in the PCC rule.

Clause 5.34.6 of 3GPP TS 23.501 V16.7.0 describes interaction between I-SMF (intermediate session management function) and SMF for the support of traffic offload by UPF controlled by the I-SMF. When the I-SMF is inserted into a PDU Session, e.g. during PDU Session establishment or due to UE mobility, the I-SMF may provide the DNAI list it supports to the SMF. Based on the DNAI list information received from I-SMF, the SMF may provide the DNAI(s) of interest for this PDU Session for local traffic steering to the I-SMF e.g. immediately or when a new or updated or removed PCC rule(s) is/are received. The DNAI(s) of interest is derived from PCC rules. The I-SMF is responsible for the insertion, modification and removal of UPF(s) to ensure local traffic steering. Based on the DNAI(s) of interest for this PDU Session for local traffic steering and UE (user equipment) location, the I-SMF determines which DNAI(s) are to be selected, selects UPF(s) acting as UL CL(classifier)/BP(Branching Point) and/or PDU Session Anchor based on selected DNAI, and insert these UPF(s) into the data path of the PDU Session.

Clause 5.34.6.2 of 3GPP TS 23.501 V16.7.0 describes N4 information sent from SMF to I-SMF for local traffic offload. The SMF generates N4 information for local traffic offload based on the available DNAI(s) indicated by the I-SMF, PCC rules associated with these DNAI(s) and charging requirement. This N4 information is sent from the SMF to the I-SMF after UL CL/Branching Point insertion/update/removal, and the I-SMF uses this N4 information to derive rules installed in the UPFs controlled by the I-SMF. The N4 information for local traffic offload corresponds to rules and parameters defined in clause 5.8.2.11 of 3GPP TS 23.501 V16.7.0. It contains identifiers allowing the SMF to later modify or delete these rules. N4 information for local traffic offload is generated by the SMF without knowledge of how many local UPF(s) are actually used by the I-SMF. The SMF indicates whether a rule within N4 information is enforced in UL CL/Branching Point or local PSA. If the rule is applied to the local PSA, the N4 information includes the associated DNAI. The I-SMF generates suitable rules for the UPF(s) based on the N4 information received from SMF. The SMF is not aware of whether there is a single PSA or multiple PSA controlled by I-SMF.

FIG. 1 shows a flowchart of addition of PDU Session Anchor and Branching Point or UL CL controlled by I-SMF. FIG. 1 is same as FIG. 4.23.9.1-1 3GPP TS 23.502 V16.7.1, the disclosure of which is incorporated by reference herein in their entirety. The steps of FIG. 1 have been described in clause 4.23.9.1 of 3GPP TS 23.502 V16.7.1, the description thereof is omitted here for brevity.

At step 2, using the list of DNAI(s) of interest for this PDU Session received from the SMF, the I-SMF decides to establish a new PDU Session Anchor e.g. due to UE mobility. The I-SMF selects a UPF and using N4 establishes the new PDU Session Anchor 2 (PSA2) of the PDU Session.

At step 4, The I-SMF invokes Nsmf_PDUSession_Update Request (Indication of UL CL or Branching Point insertion, IPv6 prefix @PSA2, DNAI(s) supported by PSA2) to SMF. Multiple local PSAs (i.e. PSA2) may be inserted at one time, each corresponds to a DNAI and/or an IPv6 prefix in the case of multi-homing.

FIG. 2 shows a flowchart of removal of PDU Session Anchor and Branching Point or UL CL controlled by I-SMF. FIG. 2 is same as FIG. 4.23.9.2-1 3GPP TS 23.502 V16.7.1. The steps of FIG. 2 have been described in clause 4.23.9.2 of 3GPP TS 23.502 V16.7.1, the description thereof is omitted here for brevity.

At step 3, the I-SMF invokes Nsmf_PDUSession_Update Request (Indication of Removal of traffic offload, Removal of IPv6 prefix @PSA2, DNAI associated with the PSA2) to SMF. Multiple local PSAs may be removed, in this case, the I-SMF provides for each local PSA to be removal, the associated DNAI and an IPv6 prefix in the case of multi-homing.

FIG. 3 shows a flowchart of change of PDU Session Anchor for Branching Point or UL CL controlled by I-SMF. FIG. 3 is same as FIG. 4.23.9.3-1 3GPP TS 23.502 V16.7.1.

The steps of FIG. 3 have been described in clause 4.23.9.3 of 3GPP TS 23.502 V16.7.1, the description thereof is omitted here for brevity.

At step 2, I-SMF decides to establish a new PDU Session Anchor and release the existing PDU Session Anchor e.g. due to UE mobility. The I-SMF selects a UPF and using N4 establishes the new PDU Session Anchor 2 of the PDU Session.

At step 3, the I-SMF invokes Nsmf_PDUSession_Update Request (Indication of Change of traffic offload, (new allocated IPv6 prefix @PSA2, DNAI(s) supported by PSA2), (Removal of IPv6 prefix @PSA0, DNAI(s) supported by PSA0)) to SMF.

3GPP TS 29.502 V16.6.0, the disclosure of which is incorporated by reference herein in their entirety, describes the detailed information of PSA information (psaInfo). An example of how to fill the psaInfo is as below.

Nsmf_PDUSession_Update Request (I-SMF Initiated)
   +HsmfUpateData
      +psaInfo
         pasInd: PSA_INSERTED/PSA_REMOVED
         dnaiList: dnaiList supported by inserted PSA2
         psaUpfId: PSA2 NfInstanceId Table 1 shows a definition of type HsmfUpdateData. Table 1 is a truncated table of Table 6.1.6.2.11-1 of 3GPP TS 29.502 V16.6.0.

TABLE 1

| Attribute name | Data type | P | Cardinality | Description |
|---|---|---|---|---|
| PsaInfo | array(PsaInformation) | C | 1 . . . N | This IE shall be present, for a PDU session with an I-SMF, if one or more PSAs UPF are inserted and/or removed by the I-SMF. |
| UlclBpInfo | UlclBpInformation | C | 0 . . . 1 | This IE shall be present, for a PDU session with an I-SMF, if an UL CL or BP UPF separate from the local PSA is inserted. |
| n4Info | N4Information | O | 0 . . . 1 | This IE may be present if the I-SMF needs to send N4 information (e.g. traffic usage reporting) to the SMF for traffic offloaded at a PSA controlled by an I-SMF. |
| n4InfoExt1 | N4Information | O | 0 . . . 1 | This IE may be present if the I-SMF needs to send additional N4 information (e.g. traffic usage reporting) to the SMF for traffic offloaded at a PSA controlled by an I-SMF. |
| n4InfoExt2 | N4Information | O | 0 . . . 1 | This IE may be present if the I-SMF needs to send additional N4 information to the SMF (e.g. during a change of PSA). |

Table 2 shows a definition of type PsaInformation. Table 2 is same as Table 6.1.6.2.41 of 3GPP TS 29.502 V16.6.0.

TABLE 2

| Attribute name | Data type | P | Cardinality | Description |
|---|---|---|---|---|
| psaInd | PsaIndication | M | 1 | This IE shall indicate, for a PDU session with an I-SMF, if a PSA and UL CL or BP is inserted or removed by the I-SMF. |
| dnaiList | array(Dnai) | M | 1 . . . N | This IE shall indicate the DNAI(s) supported by the PSA that is inserted or removed. |
| ueIpv6Prefix | Ipv6Prefix | C | 0 . . . 1 | This IE shall be present if a PSA and UL CL or BP is inserted or removed, and IPv6 multi-homing applies to the PDU session. |
| psaUpfId | NfInstanceId | C | 0 . . . 1 | This IE shall be present if a PSA UPF is inserted by the I-SMF. When present, it shall contain the identifier of the PSA UPF. |

Table 3 shows a definition of type N4Information. Table 3 is same as Table 6.1.6.2.41 of 3GPP TS 29.502 V16.6.0.

TABLE 3

| Attribute name | Data type | P | Cardinality | Description |
| --- | --- | --- | --- | --- |
| n4MessageType | N4MessageType | M | 1 | This IE shall indicate the PFCP message signalled in the n4MessagePayload. |
| n4MessagePayload | RefToBinaryData | M | 1 | This IE shall reference the N4 Message Payload binary data (for the n4Info attribute) or the N4 Information Ext1 binary data (for the n4InfoExt1 attribute), see clause 6.1.6.4.5. |
| n4DnaiInfo | DnaiInformation | C | 0 . . . 1 | This IE shall be present if the N4 information relates to a PSA. When present, it shall indicate the DNAI related to the N4 Information. If this IE is not present, this indicates N4 information relates to an UL CL or BP. |

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

FIG. 4 shows an exemplify architecture of usage of an UL Classifier/IPv6 multi-homing for a PDU Session controlled by I-SMF with multiple Local PSAs according to an embodiment of the present disclosure.

When multiple local PSAs (e.g., PSA2 and PSA3) are to be inserted for example at one time, for each local PSA, a list of DNAIs that are supported by each local PSA is provisioned from the I-SMF to SMF, and the psaUpfid is also provisioned from the I-SMF to SMF. psaUpfid may correspond to the UPF's NfInstanceId which is used in N40 interface for charging purpose if the Quota is granted for each UPF (see clause 5.2.1.10 of 3GPP TS 32.255 V17.0.0, the disclosure of which is incorporated by reference herein in their entirety). Then the problem is that when I-SMF needs to send N4 information (e.g. traffic usage reporting) to the SMF for traffic offloaded at PSAs controlled by the I-SMF, it should indicate which PSA the N4 information (e.g. traffic usage reporting) is corresponding to, while all the PFCP (Packet Forwarding Control Plane) session messages carried on N16a interface (e.g., PFCP Session Modification Request/Response, PFCP Session Deletion Request/Response, PFCP Session Report Request/Response) don't have the corresponding UPF identifier information. And currently, there is only a parameter 'n4DnaiInfo' to match the psaUpfId information, see Table 3 above. When there are multiple local PSAs controlled by the I-SMF, there may be a problem for how to identify which PSA the N4 information is corresponding to if the dnaiList of the PSAs has at least one overlapped value. For example, the SMF already has the information of PSA2 dnaiList(a, b, c) and PSA3 dnaiList(b, c, d) based on a previous received Nsmf_PDUSession_Update Request (I-SMF Initiated) and may receive two n4info with n4DnaiInfo '13', then the SMF is not able to identify which PSA the n4Info is corresponding to.

On the vice visa, when the SMF need to send N4 information to the I-SMF for the control of traffic offloaded at PSA2 or PSA3 or both PSA2 and PSA3 controlled by the I-SMF, the I-SMF can't identify which PSA the N4 information with n4DnaiInfo "b" is corresponding to, since both PSA2 and PSA3 provide the same n4DnaiInfo "b".

It is noted that there may be two or more UPFs supporting at least one same DNAI to achieve load balance and node redundancy through FIG. 4 only shows two UPFs supporting the same DNAI "b".

To overcome or mitigate at least one of above mentioned problems or other problems, the embodiments of the present disclosure propose an improved solution of session service management.

According to a first aspect of the present disclosure, there is provided a method performed by a first session management function. The method comprises determining first N4 information related to a user plane function (UPF). The first N4 information comprises an identifier of the UPF. The method further comprises sending a first message comprising the first N4 information to a second session management function.

In an embodiment, determining the first N4 information related to the UPF comprises: receiving a second message comprising second N4 information related to the UPF from the UPF, wherein the second N4 information does not comprise the identifier of the UPF; and adding the identifier of the UPF to the second N4 information to generate the first N4 information.

In an embodiment, determining the first N4 information related to the UPF comprises receiving a third message comprising third N4 information related to the UPF from the UPF, wherein the third N4 information comprises the identifier of the UPF; and using the third N4 information as the first N4 information.

In an embodiment, the method further comprises receiving a fourth message comprising fourth N4 information related to the UPF from the second session management function, wherein the fourth N4 information comprises the identifier of the UPF. The method further comprises sending the fourth message to the UPF based on the identifier of the UPF.

In an embodiment, the first session management function comprises an intermediate session management function.

In an embodiment, the N4 information related to the UPF is comprised in at least one of a session release message; a session update message; a session modification message; or a session report message.

In an embodiment, a role of the N4 information comprises at least one of: the N4 information is used by a session management function to report traffic usage for traffic offloaded at the UPF; or the N4 information is used by a session management function to control traffic offloaded at the UPF.

In an embodiment, the UPF comprises a protocol data unit session anchor (PSA) UPF.

According to a second aspect of the present disclosure, there is provided a method performed by a second session management function. The method comprises receiving a first message comprising first N4 information related to a user plane function (UPF) from a first session management function. The first N4 information comprises an identifier of the UPF. The method further comprises processing the first message based on identifier of the UPF.

In an embodiment, the method further comprises sending a fourth message comprising fourth N4 information related to the UPF to the first session management function. The fourth N4 information comprises the identifier of the UPF.

According to a third aspect of the present disclosure, there is provided a first session management function. The first session management function comprises a processor and a memory coupled to the processor. Said memory contains instructions executable by said processor. Said first session management function is operative to determine first N4 information related to a user plane function, UPF. The first N4 information comprises an identifier of the UPF. Said first session management function is further operative to send a first message comprising the first N4 information to a second session management function.

According to a fourth aspect of the present disclosure, there is provided a second session management function. The second session management function comprises a processor and a memory coupled to the processor. Said memory contains instructions executable by said processor. Said second session management function is operative to receive a first message comprising first N4 information related to a user plane function (UPF) from a first session management function, wherein the first N4 information comprises an identifier of the UPF. Said second session management function is further operative to process the first message based on identifier of the UPF.

According to a fifth aspect of the present disclosure, there is provided a first session management function. The first session management function comprises a determining module and a first sending module. The determining module may be configured to determine first N4 information related to a user plane function (UPF). The first N4 information comprises an identifier of the UPF. The first sending module may be configured to send a first message comprising the first N4 information to a second session management function.

In an embodiment, the first session management function may further comprise a receiving module configured to receive a fourth message comprising fourth N4 information related to the UPF from the second session management function. The fourth N4 information comprises the identifier of the UPF.

In an embodiment, the first session management function may further comprise a second sending module configured to send the fourth message to the UPF based on the identifier of the UPF.

According to a sixth aspect of the present disclosure, there is provided a second session management function. The second session management function comprises a receiving module and a processing module. The receiving module may be configured to receive a first message comprising first N4 information related to a user plane function (UPF) from a first session management function. The first N4 information comprises an identifier of the UPF. The processing module may be configured to process the first message based on identifier of the UPF.

In an embodiment, the second session management function may further comprise a sending module configured to send a fourth message comprising fourth N4 information related to the UPF to the first session management function. The fourth N4 information comprises the identifier of the UPF.

According to a seventh aspect of the disclosure, there is provided a computer program product comprising instructions which when executed by at least one processor, cause the at least one processor to perform the method according to any one of the first and second aspects.

According to an eighth aspect of the disclosure, there is provided a computer-readable storage medium storing instructions which when executed by at least one processor, cause the at least one processor to perform the method according to any one of the first and second aspects.

Embodiments herein afford many advantages, of which a non-exhaustive list of examples follows. In some embodiments herein, the proposed solution can enable the session management function such as SMF and I-SMF to identify which UPF (such as PSA UPF) the N4information is corresponding to when multiple local UPFs (such as PSA UPF) are inserted and controlled by the session management function. In some embodiments herein, the proposed solution can save the interaction between the session management function such as I-SMF and the UPF such as PSA UPF. In some embodiments herein, the proposed solution can simplify the handling of the N16a N4 information. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 6 shows a flowchart of a method according to an embodiment of the present disclosure;

FIG. 7 shows a flowchart of a method according to another embodiment of the present disclosure;

FIG. 8 shows a flowchart of a method according to an embodiment of the present disclosure;

DETAILED DESCRIPTION

Figure 1:
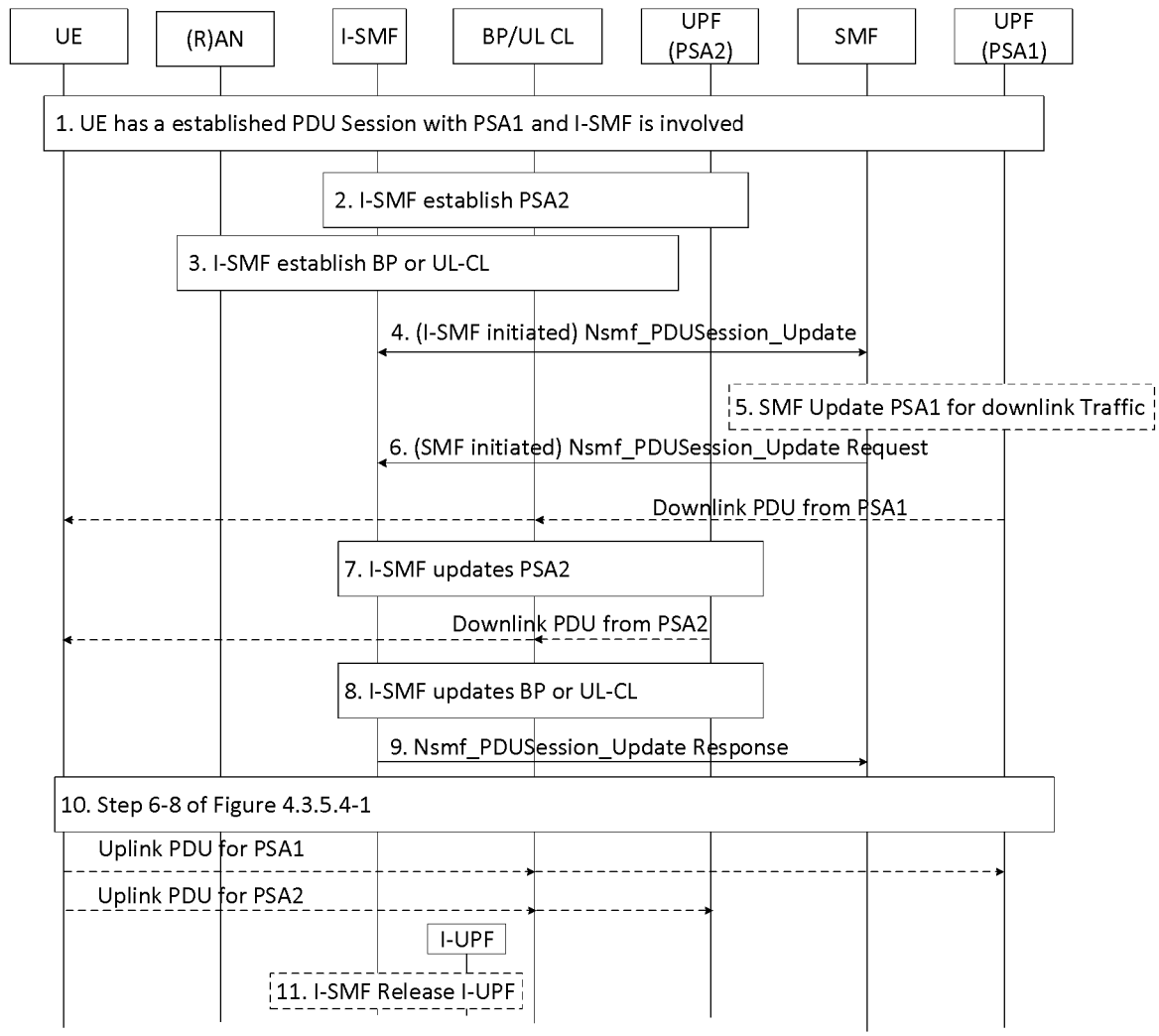
FIG. 1 shows a flowchart of addition of PDU Session Anchor and Branching Point or UL CL controlled by I-SMF.
Figure 2:
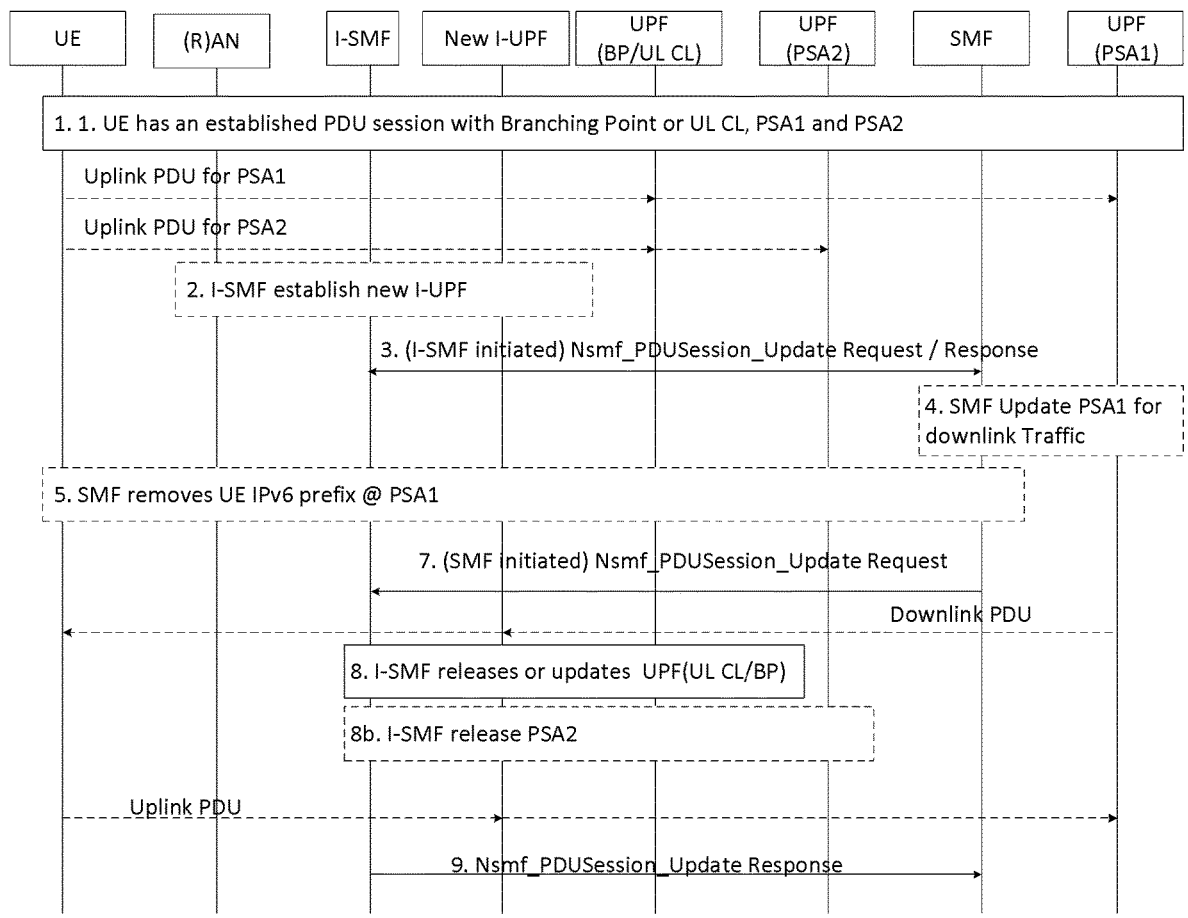
FIG. 2 shows a flowchart of removal of PDU Session Anchor and Branching Point or UL CL controlled by I-SMF.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network function (NF)" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include a plurality of NFs such as MME (Mobile Management Entity), HSS (home subscriber server), Policy and Charging Rules Function (PCRF), Packet Data Network Gateway (PGW), PGW control plane (PGW-C or P-GW-C), Serving gateway (SGW), SGW control plane (SGW-C), E-UTRAN Node B (eNB), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 5:
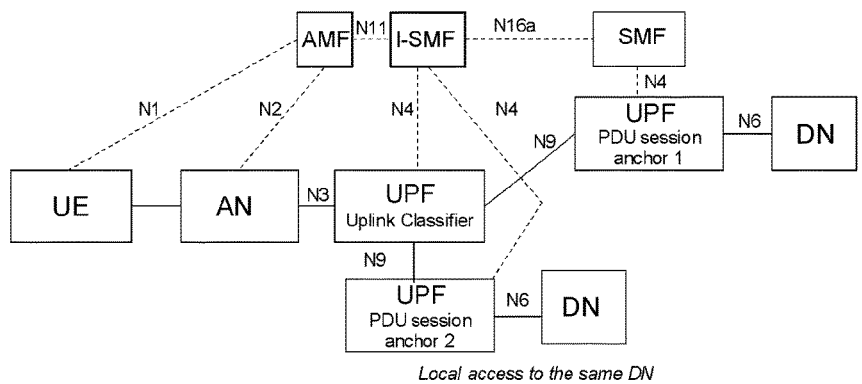
FIG. 5 schematically shows a high level architecture in the fifth generation network according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 5. For simplicity, the system architecture of FIG. 5 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 5 schematically shows a high level architecture in the fifth generation network according to an embodiment of the present disclosure. For example, the fifth generation network may be 5GS. The architecture of FIG. 5 is same as FIG. 5.34.4-1 as described in 3GPP TS 23.501 V16.7.0, the disclosure of which is incorporated by reference herein in its entirety. The system architecture of FIG. 5 may comprise some exemplary elements such as AMF, DN (data network), SMF, I-SMF UPF, UE, AN (access network), etc.

FIG. 5 also shows some reference points such as N1, N2, N3, N4, N6, N1, N16a and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 5 may be responsible for functions such as session management, access and mobility management, user plane function, UL CL etc. The AMF, SMF, I-SMF and UPF may include the functionality for example as defined in clause 6.2 of 3GPP TS23.501 V16.7.0.

In an embodiment, the subject matter described herein may be implemented in the architecture as described in clause 5.34.2 of 3GPP TS23.501 V16.7.0.

Though only one PSA UPF 2 is shown in FIG. 5, there may be two or more PSA UPF 2 controlled by the I-SMF in other embodiments.

FIG. 6 shows a flowchart of a method according to an embodiment of the present disclosure, which may be performed by an apparatus implemented in/as or communicatively coupled to a first session management function. As such, the apparatus may provide means or modules for accomplishing various parts of the method 600 as well as means or modules for accomplishing other processes in conjunction with other components. The first session management function may be any suitable entity or node which can implement the session management function. For example, the first session management function may be SMF or I-SMF.

At block 602, the first session management function may determine first N4 information related to a user plane function (UPF). The first N4 information comprises an identifier of the UPF.

The first N4 information may be same as the N4information as described in clause 6.1.6.2.43 of 3GPP TS 29.502 V16.6.0 except that it further includes the identifier of the UPF.

In an embodiment, the definition of the first N4 information may be as Table 4, where an indication 'psaUpfId' is added in the first N4 information.

TABLE 4

| Attribute name | Data type | P | Cardinality | Description |
|---|---|---|---|---|
| n4MessageType | N4MessageType | M | 1 | This IE shall indicate the PFCP message signalled in the n4MessagePayload. |
| n4MessagePayload | RefToBinaryData | M | 1 | This IE shall reference the N4 Message Payload binary data (for the n4Info attribute) or the N4 Information Ext1 binary data (for the n4InfoExt1 attribute), see clause 6.1.6.4.5. |
| n4DnaiInfo | DnaiInformation | C | 0...1 | This IE shall be present if the N4 information relates to a PSA. When present, it shall indicate the DNAI related to the N4 Information. If this IE is not present, this indicates N4 information relates to an UL CL or BP. |
| psaUpfId | NfInstanceId | M | 1 | This IE shall be present if the N4 information relates to a PSA. When present, it shall indicate the identifier of the PSA UPF. |

The first session management function may determine the first N4 information related to the UPF in various ways. For example, the first session management function may receive the first N4 information related to the UPF which may have comprised the identifier of the UPF. Alternatively, the first session management function may add the identifier of the UPF to the first N4 information related to the UPF when the first N4 information related to the UPF does not comprise the identifier of the UPF.

In a first embodiment, the first session management function may add the identifier of the UPF to the first N4 information. As a first example, the first session management function may receive a second message comprising second N4 information related to the UPF from the UPF. The second N4 information does not comprise the identifier of the UPF. In this case, the first session management function may add the identifier of the UPF to the second N4 information to generate the first N4 information.

In a second embodiment, the first session management function may receive a third message comprising third N4 information related to the UPF from the UPF. The third N4 information comprises the identifier of the UPF. In this case, the first session management function may use the third N4 information as the first N4 information.

In a third embodiment, the first session management function may receive information regarding the UPF from the second session management function. The information regarding the UPF comprises the identifier of the UPF. The first session management function may determine the first N4 information related to the UPF based on the information regarding the UPF. For example, the first session management function may add the identifier of the UPF to the first N4 information related to the UPF.

At block 604, the first session management function may send a first message comprising the first N4 information to a second session management function. The second session management function may be SMF or I-SMF. For example, when the first session management function is SMF, the second session management function may be I-SMF. When the first session management function is I-SMF, the second session management function may be SMF.

The first message may be any suitable message which can be transmitted between the first session management function and the second session management function. For example, the first message may be the message including the N4 information transmitted between two SMFs as described in various 3GPP standards such as 3GPP TS 23.502 V16.7.0, 3GPP TS 29.502 V16.6.0, etc. except that the N4 information should be replaced with the first N4 information according to embodiment of the present disclosure.

In an embodiment, the N4 information related to the UPF may be comprised in at least one of a session release message; a session update message; a session modification message; or a session report message. For example, the N4 information related to the UPF may be comprised in at least one of Nsmf_PDUSession_Release request, or Nsmf_PDUSession_Update Request, Nsmf_PDUSession_Update Response as described in 3GPP TS 23.502 V16.7.0, PFCP Session Modification Request/Response, PFCP Session Deletion Request/Response, PFCP Session Report Request/Response as described in 3GPP TS 29.502 V16.6.0.

In an embodiment, a role of the N4 information may comprise at least one of:
 the N4 information is used by a session management function to report traffic usage for traffic offloaded at the UPF; or
 the N4 information is used by a session management function to control traffic offloaded at the UPF.

In an embodiment, the UPF comprises a protocol data unit session anchor (PSA) UPF.

FIG. 7 shows a flowchart of a method according to another embodiment of the present disclosure, which may be performed by an apparatus implemented in/as or communicatively coupled to the first session management function. As such, the apparatus may provide means or modules for accomplishing various parts of the method 700 as well as means or modules for accomplishing other processes in conjunction with other components. For some parts which have been described in the above embodiments, the description thereof is omitted here for brevity.

At block 702, the first session management function may receive a fourth message comprising fourth N4 information related to the UPF from the second session management function. The fourth N4 information comprises the identifier of the UPF.

At block 704, the first session management function may send the fourth message to the UPF based on the identifier of the UPF.

For example, when the second session management function may require the first session management function to report traffic usage for traffic offloaded at the UPF or to control traffic offloaded at the UPF, the second session management function may send the fourth message to the first session management function and then the first session management function may receive the fourth message.

FIG. 8 shows a flowchart of a method according to another embodiment of the present disclosure, which may be performed by an apparatus implemented in/as or communicatively coupled to a second session management function. As such, the apparatus may provide means or modules for accomplishing various parts of the method 800 as well as means or modules for accomplishing other processes in conjunction with other components. For some parts which have been described in the above embodiments, the description thereof is omitted here for brevity.

At block 802, the second session management function may receive a first message comprising first N4 information related to a user plane function (UPF) from a first session management function. The first N4 information comprises an identifier of the UPF. For example, the first session management function may send the first message to the second session management function at block 604 of FIG. 6, and then the second session management function may receive the first message.

At block 804, the second session management function may process the first message based on identifier of the UPF. For example, depending on the specific type of the first message, the second session management function may perform a corresponding processing. For example, when the first message is the message including the N4 information as described in 3GPP TS 23.502 V16.7.0 and 3GPP TS 29.502 V16.6.0, the second session management function may perform the corresponding processing as described in 3GPP TS 23.502 V16.7.0 and 3GPP TS 29.502 V16.6.0.

At block 806, optionally, the second session management function may send a fourth message comprising fourth N4 information related to the UPF to the first session management function. The fourth N4 information comprises the identifier of the UPF. For example, based on the processing result of block 804, the second session management function may send the fourth message comprising fourth N4 information related to the UPF to the first session management function. Alternatively when the second session management function may require the first session management function to report traffic usage for traffic offloaded at the UPF or to control traffic offloaded at the UPF, the second session management function may send a corresponding fourth message to the first session management function.

In an embodiment, an indication 'psaUpfId' may be added in N4Information to indicate which PSA the N4Information is sent to. The N4Information may be used by an I-SMF to report traffic usage reporting to the SMF for traffic offloaded at a PSA controlled by the I-SMF or may be used by SMF to send N4 information to the I-SMF for the control of traffic offloaded at a PSA controlled by an I-SMF.

In an embodiment, for the procedure as shown in FIG. 1, the step 2, "I-SMF establishes PFCP Session with PAS2", can be moved and merged into step 7. In case a new IPv6 prefix corresponding to PSA2 is allocated by the UPF, it can't be moved and merged to step 7. And then in step 7, the I-SMF interacts with PSA2 via N16a providing N4 rules determined in step 6. It also provides the Branching Point or UL CL CN (core network) Tunnel Information for downlink traffic if the PSA2 and the UL CL/Branching Point are supported by different UPF(s). The PSA2 CN Tunnel Information of the local N9 termination on the PSA2 may be determined. Then in Step 8, the I-SMF updates the Branching Point or UL CL via N16a providing N4 rules determined in step 6. The I-SMF updates the Branching point or ULCL with PSA2 CN Tunnel Information. The benefit is that it can save the interaction between I-SMF and PSA2 and simplify the handling of the N16a N4 information.

Figure 3:
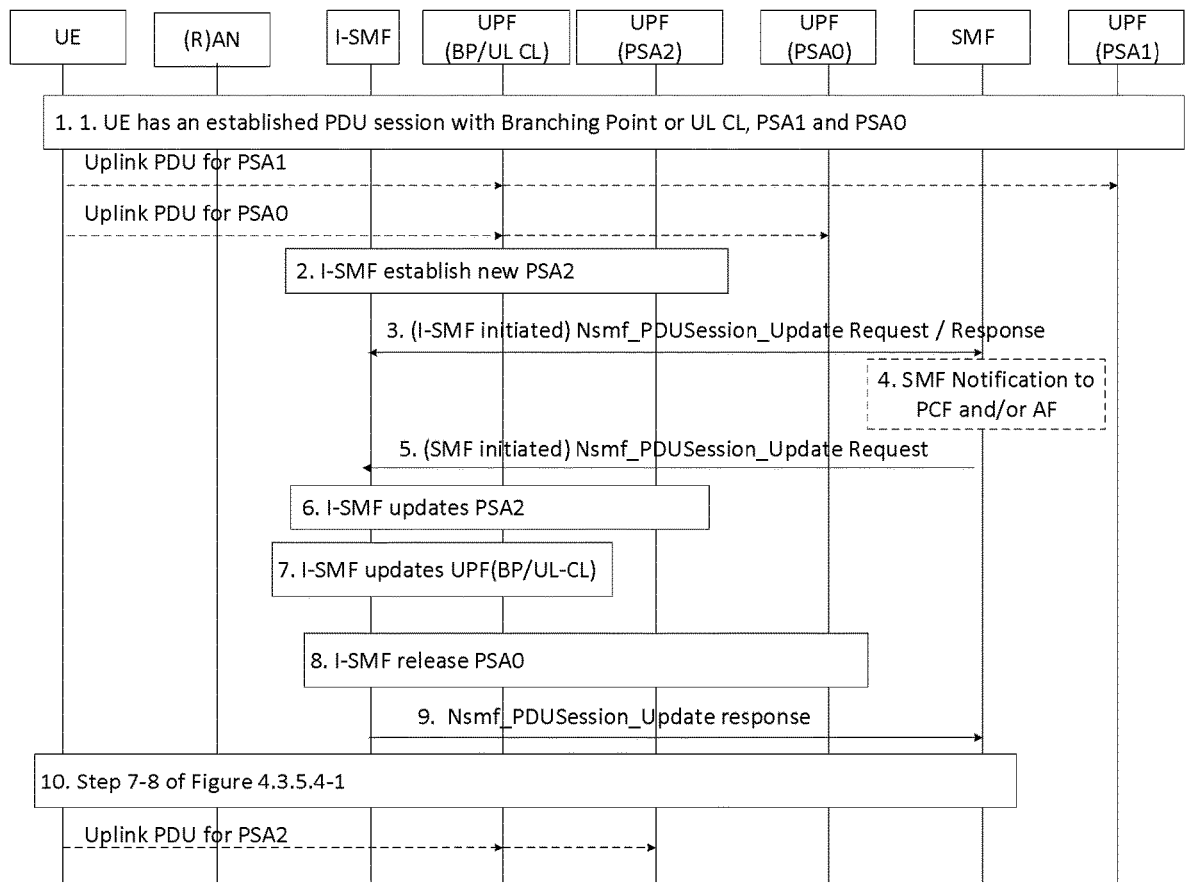
FIG. 3 shows a flowchart of change of PDU Session Anchor for Branching Point or UL CL controlled by I-SMF.
Figure 4:
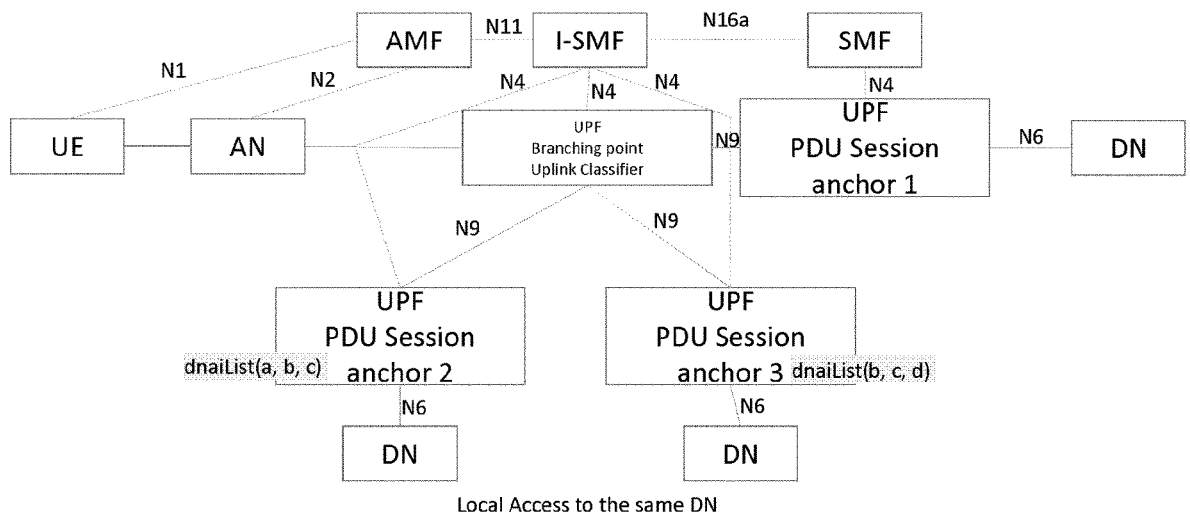
FIG. 4 shows an exemplify architecture of usage of an UL Classifier/IPv6 multi-homing for a PDU Session controlled by I-SMF with multiple Local PSAs according to an embodiment of the present disclosure.

In an embodiment, for the procedure as shown in FIG. 3, step 2, "I-SMF establishes PFCP Session with PAS2" can be moved and merged into step 6. In case a new IPv6 prefix corresponding to PSA2 is allocated by the UPF, it can't be moved and merged to step 6. And then steps 6-7 is the same as steps 7-8 of FIG. 1. The benefit is that it can save the interaction between I-SMF and PSA2 and simplify the handling of the N16a N4 information.

Embodiments herein afford many advantages, of which a non-exhaustive list of examples follows. In some embodiments herein, the proposed solution can enable the session management function such as SMF and I-SMF to identify which UPF (such as PSA UPF) the N4information is corresponding to when multiple local UPFs (such as PSA UPF) are inserted and controlled by the session management function. In some embodiments herein, the proposed solution can save the interaction between the session management function such as I-SMF and the UPF such as PSA UPF. In some embodiments herein, the proposed solution can simplify the handling of the N16a N4 information. The embodiments herein are not limited to the features and advantages mentioned above. A person skilled in the art will recognize additional features and advantages upon reading the following detailed description.

The various blocks shown in FIGS. 6-8 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 9:
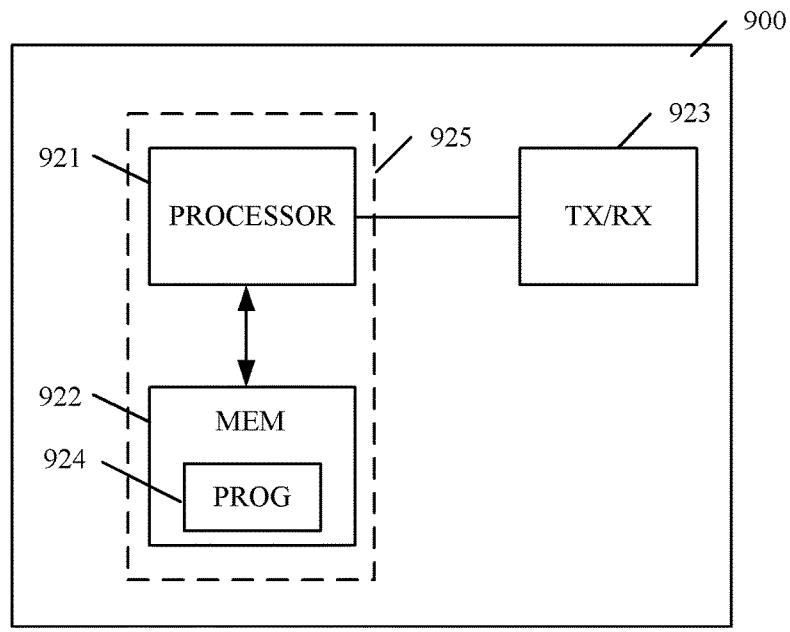
FIG. 9 is a block diagram showing an apparatus suitable for practicing some embodiments of the disclosure.

FIG. 9 is a block diagram showing an apparatus suitable for practicing some embodiments of the disclosure. For example, any one of the first session management function and the second session management function described above may be implemented as or through the apparatus 900.

The apparatus 900 comprises at least one processor 921, such as a digital processor (DP), and at least one memory (MEM) 922 coupled to the processor 921. The apparatus 920 may further comprise a transmitter TX and receiver RX 923 coupled to the processor 921. The MEM 922 stores a program (PROG) 924. The PROG 924 may include instructions that, when executed on the associated processor 921, enable the apparatus 920 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first session management function, the memory 922 contains instructions executable by the processor 921, whereby the first session management function according to any of the methods related to the first session management function as described above.

In an embodiment where the apparatus is implemented as or at the second session management function, the memory 922 contains instructions executable by the processor 921, whereby the second session management function operates according to any of the methods related to the second session management function as described above.

Figure 10:
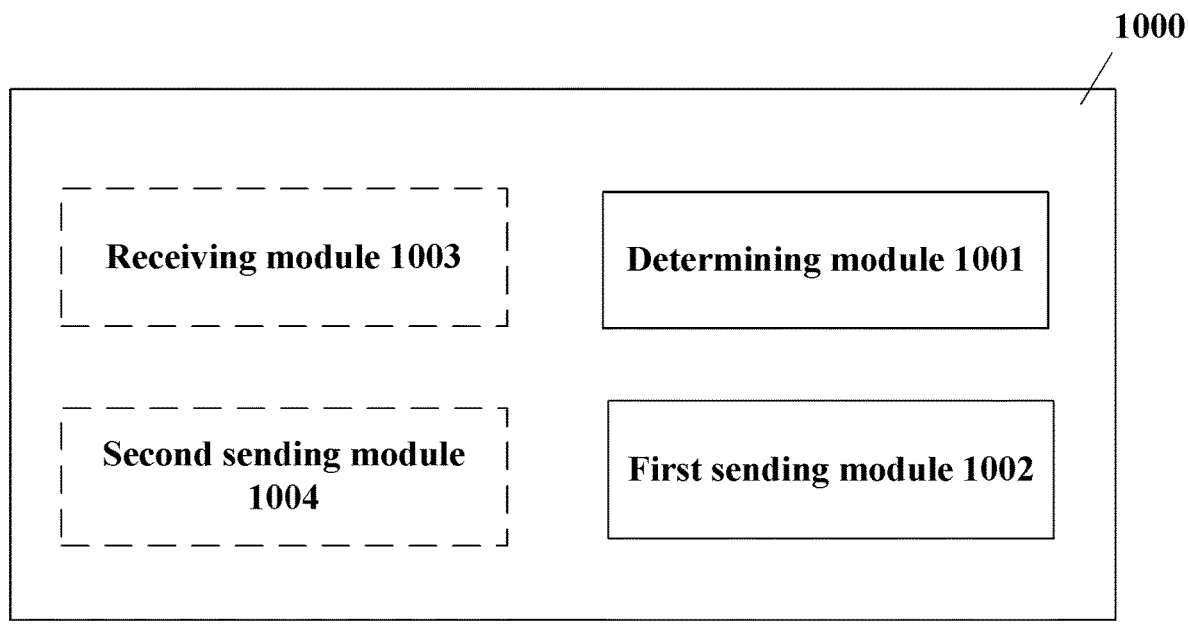
FIG. 10 is a block diagram showing a first session management function according to an embodiment of the disclosure.

FIG. 10 is a block diagram showing a first session management function according to an embodiment of the disclosure. As shown, the first session management function 1000 comprises a determining module 1001 and a first sending module 1002. The determining module 1001 may be configured to determine first N4 information related to a user plane function (UPF). The first N4 information comprises an identifier of the UPF. The first sending module 1002 may be configured to send a first message comprising the first N4 information to a second session management function.

In an embodiment, the first session management function 1000 may further comprise a receiving module 1003 configured to receive a fourth message comprising fourth N4 information related to the UPF from the second session management function. The fourth N4 information comprises the identifier of the UPF.

In an embodiment, the first session management function 1000 may further comprise a second sending module 1004 configured to send the fourth message to the UPF based on the identifier of the UPF.

Figure 11:
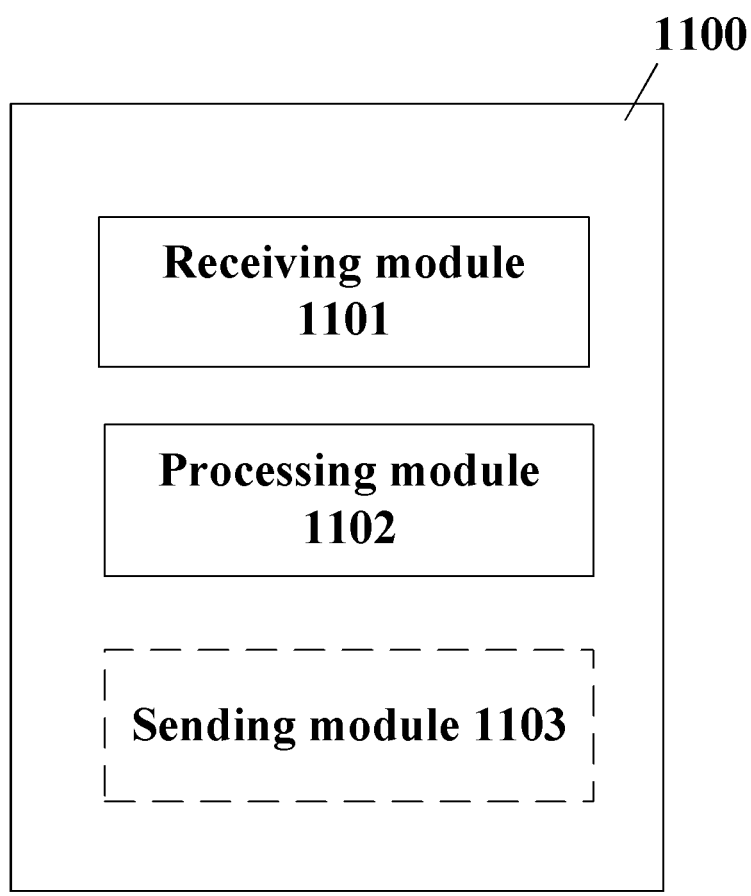
FIG. 11 is a block diagram showing a second session management function according to an embodiment of the disclosure.

FIG. 11 is a block diagram showing a second session management function according to an embodiment of the disclosure. As shown, the second session management function 1100 comprises a receiving module 1101 and a processing module 1102. The receiving module 1101 may be configured to receive a first message comprising first N4 information related to a user plane function (UPF) from a first session management function. The first N4 information comprises an identifier of the UPF. The processing module 1102 may be configured to process the first message based on identifier of the UPF.

In an embodiment, the second session management function 1100 may further comprise a sending module 1103 configured to send a fourth message comprising fourth N4 information related to the UPF to the first session management function. The fourth N4 information comprises the identifier of the UPF.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first session management function and the second session management function described above may not need a fixed processor or memory, any computing resource and storage resource may be arranged from the first session management function and the second session management function in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first session management function, comprising:
   determining first N4 information related to a user plane function (UPF) wherein the first N4 information comprises an identifier of the UPF; and
   sending a first message comprising the first N4 information to a second session management function.

2. The method according to claim 1, wherein determining the first N4 information related to the UPF comprises:
   receiving a second message comprising second N4 information related to the UPF from the UPF, wherein the second N4 information does not comprise the identifier of the UPF; and
   adding the identifier of the UPF to the second N4 information to generate the first N4 information.

3. The method according to claim 1, wherein determining the first N4 information related to the UPF comprises:
   receiving a third message comprising third N4 information related to the UPF from the UPF, wherein the third N4 information comprises the identifier of the UPF; and
   using the third N4 information as the first N4 information.

4. The method according to claim 1, further comprising:
   receiving a fourth message comprising fourth N4 information related to the UPF from the second session management function, wherein the fourth N4 information comprises the identifier of the UPF; and
   sending the fourth message to the UPF based on the identifier of the UPF.

5. The method according to claim 1, wherein the first session management function comprises an intermediate session management function.

6. The method according to claim 1, wherein the N4 information related to the UPF is comprised in at least one of:
   a session release message;
   a session update message;
   a session modification message; or
   a session report message.

7. The method according to claim 1, wherein a role of the N4 information comprises at least one of
   the N4 information is used by a session management function to report traffic usage for traffic offloaded at the UPF; or
   the N4 information is used by a session management function to control traffic offloaded at the UPF.

8. The method according to claim 1, wherein the UPF comprises a protocol data unit session anchor (PSA) UPF.

9. A method performed by a second session management function, comprising:
   receiving a first message comprising first N4 information related to a user plane function, UPF, from a first session management function, wherein the first N4 information comprises an identifier of the UPF; and
   processing the first message based on the identifier of the UPF.

10. The method according to claim 9, further comprising:
    sending a fourth message comprising fourth N4 information related to the UPF to the first session management function, wherein the fourth N4 information comprises the identifier of the UPF.

11. The method according to claim 9, wherein the first session management function comprises at least one of an intermediate session management function.

12. The method according to claim 9, wherein the N4 information related to the UPF is comprised in at least one of:
    a session release message;
    a session update message;
    a session modification message; or
    a session report message.

13. The method according to claim 9, wherein a role of the N4 information comprises at least one of
    the N4 information is used by a session management function to report traffic usage for traffic offloaded at the UPF; or
    the N4 information is used by a session management function to control traffic offloaded at the UPF.

14. The method according to claim 9, wherein the UPF comprises a protocol data unit session anchor (PSA) UPF.

15. A first session management function, comprising:
    a processor; and
    a memory coupled to the processor, said memory containing instructions executable by said processor, whereby said first session management function is operative to:
    determine first N4 information related to a user plane function (UPF) wherein the first N4 information comprises an identifier of the UPF; and
    send a first message comprising the first N4 information to a second session management function.

16. The first session management function according to claim 15, wherein the first session management function operative to determine the first N4 information related to the UPF comprises the first session management function operative to:
    receive a second message comprising second N4 information related to the UPF from the UPF, wherein the second N4 information does not comprise the identifier of the UPF; and
    add the identifier of the UPF to the second N4 information to generate the first N4 information.

17. A second session management function, comprising:
a processor; and
a memory coupled to the processor, said memory containing instructions executable by said processor, whereby said second session management function is operative to:
receive a first message comprising first N4 information related to a user plane, function (UPF) from a first session management function, wherein the first N4 information comprises an identifier of the UPF; and
process the first message based on the identifier of the UPF.

18. The second session management function according to claim 17, wherein the second session management function is further operative to send a fourth message comprising fourth N4 information related to the UPF to the first session management function, wherein the fourth N4 information comprises the identifier of the UPF.

19. A non-transitory computer-readable storage medium storing instructions which when executed by at least one processor, cause the at least one processor to perform the method according to claim 1.

20. A computer program product comprising a non-transitory computer-readable storage medium storing instructions which when executed by at least one processor, cause the at least one processor to perform the method according to claim 1.

* * * * *